Patented June 20, 1939

2,162,924

UNITED STATES PATENT OFFICE 2,162,924

COMPOSITION AND METHOD OF MAKING SAME

Donald H. Spitzli, Arlington, and Reeves L. Kennedy, Plainfield, N. J., assignors to Congoleum-Nairn Inc., a corporation of New York No Drawing. Application May 19, 1937,
Serial No. 143,516

19 Claims. (Cl. 106—23)

This invention relates to compositions and method of making same, and relates especially to compositions containing coagulated drying oil and chlorinated rubber and suitable for linoleum or the like.

The wearing portion or surface layer of linoleum is formed from a moldable composition which usually comprises an intimately commingled mass containing oxidized and/or polymerized drying oil, resin, wood and/or cork flour, mineral filler, and pigment. Linoleum compositions of the character aforesaid have good wearing properties and are attractive in appearance and afford a popular and desirable covering material for floors, walls, etc. In the manufacture of covering materials from linoleum composition a surface layer of linoleum composition is commonly formed integral with some suitable sheetlike and strain-resisting foundation member such as burlap, asphalt impregnated felt, or the like in well known ways. The linoleum composition may also be formed into articles (without any foundation member) such as tile-like articles which are adapted to be set in place on a suitable sub-structure.

While linoleum compositions are desirable in many respects for covering materials of the character aforesaid, such compositions as heretofore commonly manufactured have had the undesirable property of poor soil resistance, that is, the fixation of foreign material, such as grit, dust, grime, etc., in a position sufficiently secure so as to be non-removable or difficultly removable by ordinary cleaning methods.

In addition to soil resistance, linoleum composition should possess other attributes, such as flexibility, resiliency, resistance to abrasion, resistance to alkalies and resistance to swelling in humid atmospheres. Heretofore when attempts have been made to improve the soil resistance of linoleum composition, difficulty has been encountered due to accompanying sacrifice of other essential properties of the linoleum. Moreover, the manufacturing difficulties involved have rendered impractical certain proposals for improving the soil resistance of linoleum compositions.

It is an object of this invention to afford a linoleum composition which has a high degree of soil resistance and linoleum composition which can be readily cleaned. It is a further object of this invention to afford these improved and desirable characteristics without sacrifice of other desirable properties. According to a preferred embodiment of this invention, soil resistance is greatly improved and at the same time resiliency, elongation, alkali resistance, abrasion resistance, pliability and flexibility are likewise improved as compared with the linoleum compositions heretofore on the market. Moreover, these improvements can be accomplished by using relatively inexpensive materials and by utilization of economical manufacturing methods.

Features of this invention relate to the method of preparing linoleum composition and to the resulting product. According to this invention a drying or semi-drying oil containing coagulated constituent is combined with chlorinated rubber so that the chlorinated rubber is greatly modified in its properties as compared with ordinary chlorinated rubber. Chlorinated rubber as that term is used herein refers to chlorinated raw rubber or chlorinated vulcanized rubber or mixtures thereof. Chlorinated rubber is well known and there are several chlorinated rubber products on the market containing about 45% to about 70% by weight of combined chlorine. Highly chlorinated rubber is a yellowish white flaky material of a horn-like character. In itself it is unsuitable as a base for a moldable composition as it is excessively hard, rigid and brittle. Heretofore it has been proposed to incorporate chlorinated rubber in compositions desired to be used for floor coverings and the like. However, such proposals have not been successful due to the fact that the resulting product did not have the necessary properties that are required of an article such as conventional linoleum.

We have found that when certain ingredients of a coagulated drying or semi-drying oil, such as a drying or semi-drying oil that has been polymerized and oxidized at elevated temperature until it has been reduced to a jelly, are blended and combined with chlorinated rubber within certain limited relative amounts and in certain ways as described more fully below, a product somewhat resembling resins in thermoplastic properties is obtained. However, the linoleum composition made from this product is markedly superior to that made from resins in that it has a very high degree of soil resistance and likewise has in high degree such properties as flexibility, pliability, alkali-resistance, abrasion-resistance, etc., as will be explained more fully below.

In the practice of this invention linoleum composition having improved characteristics can be manufactured using conventional fillers, pigments, etc. However, the practice of this invention enables one to reduce or eliminate the proportion of resinous material such as rosin that is usually used in linoleum composition. Rosin, other resinous materials and the combinations of rosin and non-hardening or non-hardened oil constituents tend to become readily soiled and the reduction in the amount, or the elimination of rosin or other resinous material according to this invention, is instrumental in achieving greatly increased soil resistance. The resins used in linoleums are thermo-plastic adhesive materials and their presence in linoleum compositions is of such importance for the purpose of securing a tough and coherent product that they have been generally used in amounts such as 15 to 35% even though their presence is undesirable from the standpoint of decreasing soil resistance.

It is a further feature of this invention that the proportion of porous vegetable fillers (e. g. uncoated wood flour or ground cork which are generally used in amounts such as about 30%) can be greatly reduced without impairing the product. Such fillers are readily soiled and the reduction in the amount of such fillers affords improved soil resistance. Heretofore attempts have been made to leave out at least part of the vegetable filler and to replace it with less easily soiled mineral filler, but such attempts have resulted in excessively brittle and otherwise unsatisfactory products. It is important according to the invention that the proportion of vegetable filler materials can be reduced to a large extent and even entirely eliminated without sacrifice of desirable properties such as flexibility, pliability, etc.

In the practice of this invention a coagulated drying or semi-drying oil is brought into admixture with chlorinated rubber, the chlorinated rubber constituting only about 1% to about 25% of the admixture and being in mutual solution with non-hardened constituents of the coagulated oil. A coagulated drying or semi-drying oil contains several different constituents. When a drying or semi-drying oil has been coagulated by subjection to heat and oxidation as is common practice in the preparation of an oil for use in linoleum cement, the oil of course contains coagulated constituents which may be referred to broadly as linoxyn. The coagulated constituents are elastic in character and constitute an extremely important component of linoleum cement. Some of the oil constituents, while oxidized, remain in fluid phase even though they may ultimately coagulate. These coagulatable fluid oxidized constituents are usually composed chiefly of oxidized glycerides of linolenic and linolic acids and occur in considerable proportion in freshly prepared linoleum cement. When the freshly prepared linoleum cement is caused to season as by subjecting the cement to mild heat for a considerable period of time, these fluid oxidized oil constituents become transformed to linoxyn. The oxidized and coagulated oil also contains certain unoxidized constituents and non-hardening constituents. Thus some of the oil which is oxidizable and coagulable when oxidized, remains unoxidized. Also some of the oil is in the form of constituents which are non-hardening because they are unoxidizable or because they will not harden even though oxidized. These non-hardening constituents comprise chiefly unoxidizable glycerides of stearic, palmitic and other saturated acids and oxidized glycerides of oleic acid. In linoleum composition both the non-hardening constituents and the still fluid though hardenable constituents (together referred to herein as "non-hardened" constituents) tend to form a sticky, adhesive and plastic mass and are not desirable in linoleum composition as they are easily soiled, are not resistant to alkalies, and tend to make the linoleum inelastic.

A convenient way of determining the proportion in a coagulated and/or oxidized drying or semi-drying oil of linoxyn, of coagulable fluid oxidized constituents, and of unoxidized and non-hardening constituents is by extraction with low-boiling solvents. By extracting the oil with ethyl ether, those constituents of the oil which remain insoluble constitute the coagulated or linoxyn phase. By thereafter extracting the remaining constituents soluble in ethyl ether with petroleum ether a further separation can be obtained, the coagulable fluid oxidized constituents being insoluble in petroleum ether and the unoxidized and non-hardening constituents being soluble in petroleum ether.

When chlorinated rubber is brought into admixture with a coagulated drying or semi-drying oil and when the chlorinated rubber is limited to about 25% or less of the admixture, we have found the non-hardened constituents of the coagulated oil can be transformed by the chlorinated rubber from a sticky, adhesive and plastic mass to a tougher and more elastic material. At the same time the chlorinated rubber can be modified from a horny and brittle mixture to a tough and elastic material.

In modifying the properties of the chlorinated rubber and of the non-hardened constituents of the oil, it is believed that the chlorinated rubber goes into mutual solution with at least some of the constituents of the oil under the conditions of mixing described below. The coagulated and hardened constituents of the oil apparently do not dissolve or become dissolved in the chlorinated rubber to any great extent. The unoxidized and non-hardening portion of the non-hardened constituents of the oil apparently go into solution with the chlorinated rubber. Some of the coagulable fluid oxidized portion of the non-hardened constituents of the oil may likewise go into solution with the chlorinated rubber, although such constituents tend to become hardened and coagulated upon seasoning and when hardened and coagulated lose to some extent the property of modifying the chlorinated rubber. However, even in the seasoned composition the residual unoxidized constituents and non-hardening constituents of the oil remain in solution in the chlorinated rubber. While as aforesaid the chlorinated rubber appears to go into solution with the non-hardened constituents of the coagulated oil, the word "solution" is to be regarded as used broadly to cover not only a true molecular solution but also quasi-solutions such as dispersions of a colloidal character.

The chlorinated rubber which contains non-hardened oil constituents dissolved therein and which is in combination with coagulated oxidized oil constituents (which mixture as a whole may be referred to as oil-chlorinated rubber material) has been found to be highly resistant to soiling and at the same time to give increased toughness, resiliency and alkali resistance to the composition. The proportion of the chlorinated rubber that is used in the linoleum composition is important not only from the standpoint of securing the proper mutual modification of the chlorinated rubber on the one hand and the unoxidized and non-hardening constituents of the coagulated oil on the other hand, but also from the point of view of obtaining a proper relationship between the amount of oil-chlorinated rubber material on the one hand and the total coagulated oil constituents on the other hand so as to afford a linoleum composition of greatly improved characteristics not only with respect to soil resistance but also with respect to other characteristics as well.

The oil-chlorinated rubber material may be brought into admixture with the other ingredients of the linoleum composition in several different ways. For example, oil-chlorinated rubber material may be made up and then used after the manner that rosin is used in linoleum composition as by replacing all or part of the rosin in the linoleum composition with the oil-chlorinated rubber material. Alternatively, the oil-chlorinated rubber material may be employed as the binder part of the linoleum composition, to replace part or all of the conventional linoleum cement. In a further modification the oil-chlorinated rubber material may be brought to a substantially dry condition and employed in finely divided form as filler dispersed in a binder, e. g., linoleum cement.

Some of the features of this invention will be apparent from the following description of an illustrative example of the practice thereof. A drying or semi-drying oil such as linseed oil or a mixture of drying and/or semi-drying oils is coagulated by polymerization and/or oxidation, with or without a drier such as lead or cobalt to a light jelly-like consistency. This, in preferred practice, may be carried out according to the Wood-Bedford process (British Patent No. 7742 of 1893) and is completed in about 12 to 14 hours. According to this process the oil is oxidized with oxygen containing gas as by aerating the oil during agitation in a closed cylindrical vessel. A temperature of about 140° to 200° F. is maintained and the aeration and agitation is continued until the oil has thickened to a jelly-like consistency.

The coagulated (and oxidized) oil prepared as described above, for example, is then mixed in a dough mixer or other suitable machine at about 200° to 240° F. (preferably in the presence of air or other oxygen containing gas which hastens the reaction) with chlorinated rubber, e. g., about 1% to 25% by weight. The chlorinated rubber preferably has a high chlorine content and while chlorinated rubber such as all of the chlorinated rubber products at present on the market having a chlorine content of about 45% to 70% by weight of combined chlorine may be used according to this invention, those products having a chlorine content of about 65% to 70% are to be preferred as they are more compatible with the coagulated oil constituents and in general yield plastics of lower viscosity. Highly chlorinated rubber is available in viscosities ranging from 6 to over 500 centipoises, the viscosity being determined on a 20%, by weight, solution in toluene with a capillary viscosimeter at 25° C. It is regarded as preferable in the practice of this invention to employ chlorinated rubber having a viscosity of 100 to 150 centipoises although chlorinated rubber of other viscosities may also be used.

During the heating and agitation of the partially coagulated oil the oil continues to oxidize and polymerize at the same time dissolving in the chlorinated rubber. The duration of the period of the heating and agitation depends on the properties desired in the product as will be described more in detail below and the process may be halted at any time by cooling the mixture.

The product of the preferred method of preparation of the oil-chlorinated rubber material is a light yellowish homogeneous mass, which may vary in characteristics, dependent upon the reaction period, from a tacky plastic to a non-tacky elastic at room temperature and in any case possessing to a greater or lesser degree the nature of a thermo-plastic.

The following are three illustrative examples of the practice of this invention in connection with the manufacture of a linoleum composition suitable for flooring or the like.

EXAMPLE 1.—*Use of oil-chlorinated rubber material as part or all of the thermo-plastic phase*

A drying or semi-drying oil is partially coagulated and brought to jelly-like consistency and then is mixed with chlorinated rubber as above described. For example, 1 part of chlorinated rubber is mixed with 9 parts of the coagulated oil. The mass is maintained at about 225° F. and agitation is continued. While the mass becomes homogeneous in about 4 to 6 hours, the heat and agitation are continued further until the desired state of oxidation of the oil is obtained. This is usually attained by heating the mixture wth agitation for 9 to 10 hours. A specific example and preferred range of the constituents of the oil component in the completed oil-chlorinated rubber material are as follows:

| | Example | Preferred range |
|---|---|---|
| | Percent | Percent |
| Linoxyn | 51 | 48.0–54.0 |
| Coagulable fluid-oxidized constituents | 25 | 28.0–22.0 |
| Unoxidized constituents and non-hardening constituents | 24 | 20.0–25.0 |

When the desired condition has been attained the mass is dumped and allowed to air cool to halt the reaction. The resulting product can be used to replace part or all of the resin content of conventional linoleum cement. The oil-chlorinated rubber material is incorporated with the linoleum cement and other ingredients of the linoleum composition in the same manner and at the same stage that linoleum cement, for example, would be incorporated in ordinary linoleum manufacture. A comparison between conventional linoleum and linoleum comprising oil-chlorinated rubber material follows:

| Formulae | Old | New |
|---|---|---|
| Linoleum cement (conventional 15%–35% resin) | Percent 31.4 | Percent |
| Linoleum cement (0%–10% resin) | | 23.6 |
| Oxidized oil-chlorinated rubber (9:1) | | 7.8 |
| Wood flour | 29.4 | 29.4 |
| Mineral filler | 19.6 | 19.6 |
| Pigment | 19.6 | 19.6 |

A comparison of the finished linoleum so prepared follows:

*New*
Seasoning_____Same.
Resiliency_____Improved more than 15%.
Pliability_____Same.
Flexibility_____Same.
Elongation_____Improved more than 25%.
Humidity effect_____Same.
Alkali resistance_____Improved more than 45%.
Color_____Improved—cleaner.
Soil resistance_____Improved.
Abrasive resistance___Improved.

EXAMPLE 2.—*Use of the oil-chlorinated rubber material as the binder for linoleum compositions*

Nine parts of oil which has been partially coagulated to a jelly-like consistency is mixed with 1 part of chlorinated rubber as above described. The mass is maintained at about 225° F. for about 7 to 8 hours and until the oil attains the desired degree of coagulation and oxidation. A specific example and preferred range of the constituents of the oil component in the completed oil-chlorinated rubber material are as follows:

|  | Example | Preferred range |
|---|---|---|
|  | Percent | Percent |
| Linoxyn | 44.0 | 40.0–48.0 |
| Coagulable fluid oxidized constituents | 32.0 | 36.0–28.0 |
| Unoxidized constituents and non-hardening constituents | 24.0 | 20.0–25.0 |

The homogeneous mass is dumped hot at the desired point and allowed to air cool to halt the reaction. This product is used in the preparation of linoleum to replace all or part of the binder as a unit. The replacement is made, of course, at the stage of linoleum manufacture that intimately combines the usual linoleum cement with the other ingredients. A comparison between conventional linoleum and linoleum containing oil-chlorinated rubber follows:—

| Formulae | Old | New |
|---|---|---|
|  | Percent | Percent |
| Linoleum cement (conventional 15%–35% resin) | 31.4 |  |
| Oxidized oil-chlorinated rubber (9:1) |  | 31.4 |
| Wood flour | 29.4 | 29.4 |
| Mineral filler | 19.6 | 19.6 |
| Pigment | 19.6 | 19.6 |

A comparison of the finished linoleum so prepared follows:

*New*
Seasoning_____Same.
Resiliency_____Improved more than 25%.
Pliability_____Same.
Flexibility_____Same.
Elongation_____Improved more than 25%.
Humidity effect_____Same.
Alkali resistance_____Improved more than 75%.
Color_____Improved—cleaner.
Soil resistance_____Improved.
Abrasive resistance____Improved.

When oil-chlorinated rubber material is comprised in the binder for a linoleum composition as illustrated in Examples 1 and 2 above the oil component of the admixture preferably contains about 40% to about 54% of coagulated constituents, about 36% to about 22% of coagulable fluid oxidized constituents and about 20% to about 25% of unoxidized constituents and non-hardening constituents.

EXAMPLE 3.—*Use of oil-chlorinated rubber material as addition to or partial replacement of the coagulated oil phase*

Oil which has been partially coagulated to a jelly-like consistency as described above is admixed with chlorinated rubber in the proportion of 4 to 1, for example, and maintained at about 225° F. for example while being agitated for about 20 to 24 hours until the oil attains a desired degree of coagulation and oxidation. The mass becomes dry and elastic in character. A specific example and preferred range of the constituents of the oil component in the completed oil-chlorinated rubber material are as follows:

|  | Example | Preferred range |
|---|---|---|
|  | Percent | Percent |
| Linoxyn | 76.0 | Not less than 74.0. |
| Coagulable fluid oxidized constituents | 7.0 | Not more than 8.0. |
| Unoxidized constituents and nonhardening constituents. | 17.0 | Not more than 18.0. |

When the desired condition has been attained the homogeneous mass is dumped while hot and allowed to air cool. The dry hard but semi-elastic mixture is used in addition to or in replacement of the coagulated oxidized oil phase of the linoleum composition and may be incorporated at the stage of linoleum manufacture at which the linoleum cement is combined with other ingredients, including fillers. A comparison between conventional linoleum and linoleum comprising oil-chlorinated rubber material of the character aforesaid follows:

| Formulae | Old | New |
|---|---|---|
|  | Percent | Percent |
| Linoleum cement (conventional 15–35% resin) | 31.4 |  |
| Linoleum cement (0%–5% resin) |  | 20.0 |
| Oxidized oil-chlorinated rubber (4:1) |  | 11.1 |
| Wood flour | 29.4 | 6.5 |
| Mineral filler | 19.6 | 38.2 |
| Pigment | 19.6 | 24.2 |

A comparison of the finished linoleum so prepared follows:

*New*
Seasoning_____Same.
Resiliency_____Improved more than 30%.
Pliability_____Improved more than 15%.
Flexibility_____Improved more than 20%.
Elongation_____Improved more than 30%.
Humidity effect_____Improved more than 70%.
Alkali resistance_____Improved more than 80%.
Color_____Improved—cleaner.
Soil resistance_____Improved.
Abrasive resistance____Improved.

In the foregoing example a large proportion of vegetable filler was replaced by mineral filler and it is to be noted that instead of decreasing the flexibility, pliability and resilience of the composition, these properties were actually improved to a pronounced degree, as a result of the presence of oil-chlorinated rubber material in the linoleum composition. Thus it is seen that our invention permits a substantial variation in the kind and amount of material used in linoleum compositions and that the employment of the oil-chlorinated rubber material allows a range of pigments (including mineral filler) or organic filler (cork and wood flours) from zero to the limit of the plastic forming ability of the binder at its maximum wetting power. Preferably the amount of porous vegetable fillers such as wood flour and ground cork is not more than about 10% of the complete composition.

The physical tests mentioned above were made as follows:

*Seasoning.*—Period necessary to lower the indentation under a 200 lb. weight applied on a 0.282 inch diameter pin for one minute, to 30% of the overall thickness of the linoleum.

*Resiliency.*—The percent of the indentation that recovers to its original position within the period of one minute after the 200 lb. weight is removed.

*Pliability.*—The angle of flexure from horizontal obtained in a one minute period by putting a 12 inch by 3 inch sample on a 9/16″ mandrel, transversely and centrally, and weighting the ends with 100 gram weights.

*Flexibility.*—The diameter of the smallest mandrel over which a 2 inch wide strip can be flexed without breaking. (Mandrel diameters change by 1/4 inch increments in the range of usual laboratory compositions).

*Elongation.*—The percentage stretch of a sample of one inch square cross section at the breaking point, under gradually increasing tension.

*Humidity effect.*—Grams of water absorbed by a sample 6″ x 6″ x 0.1″ in 8 days at 85% humidity from an initial bone dry condition; and the percent dimensional increase in the cross direction under the same conditions.

*Alkali resistance.*—The depth which 2 c. c. of 5% sodium hydroxide will destroy in one hour acting on a constant area.

In carrying out this invention other fillers may be used in addition to the usual vegetable and mineral fillers. For example a filler in the form of linoxyn particles may be used such as the linoxyn filler particles mentioned in our co-pending application Serial No. 110,303 filed November 11, 1936 for Composition and method of making same. Such filler can be used to replace all or part of the vegetable filler and when used in linoleum compositions containing oil-chlorinated rubber material the resulting product is very resilient and very resistant to soiling. For example, a linoleum composition containing 26% of oxidized oil-chlorinated rubber material (containing 4 parts of oxidized oil to 1 part of chlorinated rubber and prepared according to Examples 1 or 2 above by way of example), 6% of wood flour, 59 parts of mineral filler, and 9 parts of linoxyn prepared from china wood oil and at least 85% insoluble in ethyl ether has been found to have outstanding resiliency and soil resistance.

Likewise linoxyn coated fillers may be used such as those described in our co-pending application Serial No. 110,304 filed November 11, 1934 for Composition and method of making same. For example, a composition consisting of 20% of oxidized oil-chlorinated rubber material (containing 4 parts of oxidized oil to 1 part of chlorinated rubber and prepared according to Examples 1 or 2 by way of example), 38% of mineral filler, 42% of particles coated with linoxyn prepared from china wood oil (at least 85% insoluble in ethyl ether) has extremely great resiliency and soil resistance.

In the preparation of the oil-chlorinated rubber materials as illustrated in the foregoing examples, it is seen that the constituents of the coagulated oil that is mixed with the chlorinated rubber may vary considerably. Thus in the freshly prepared oil-chlorinated rubber materials the constituents of the coagulated oil preferably vary within the following ranges:

|  | Per cent |
|---|---|
| Coagulated constituents | 38.0 to 76 |
| Coagulable fluid oxidized constituents | 37.0 to 7 |
| Unoxidized constituents and non-hardening constituents | 25.0 to 17 |

During the seasoning of linoleum composition there is a gradual change which is distinguished primarily by the transition of coagulable fluid oxidized constituents to linoxyn. Likewise there is some tendency of unoxidized but oxidizable constituents to become oxidized and to harden. In ordinary linoleum composition the transition that occurs in the oil material of the linoleum cement usually occurs within the following limits.

|  | Fresh composition ordinary linoleum cement | Seasoned composition ordinary linoleum cement |
|---|---|---|
|  | *Percent* | *Percent* |
| Linoxyn | 40 to 48 | 70 to 80 |
| Coagulable fluid oxidized constituents | 36 to 28 | 5 to 10 |
| Unoxidized and non-hardening constituents | 20 to 25 | 15 to 25 |

Referring to the linoleum compositions exemplified in Examples 1, 2 and 3 above, the compositions contain in admixture filler in major proportion, chlorinated rubber, and oxidized oil constituents. During seasoning the oxidized oil constituents of the composition (including both the oxidized oil constituents of the oil-chlorinated rubber material as originally produced and any additional oxidized oil constituents, e. g., contained in linoleum cement, that may be added in making the complete linoleum composition) undergo the following changes:

*Example 1*

|  | Fresh composition | Seasoned composition |
|---|---|---|
|  | *Percent* | *Percent* |
| Linoxyn | 40 to 50 | 70 to 80 |
| Coagulable fluid oxidized constituents | 28 to 36 | 5 to 10 |
| Unoxidized constituents and non-hardening constituents | 20 to 25 | 15 to 25 |

*Example 2*

|  | Fresh composition | Seasoned composition |
|---|---|---|
|  | *Percent* | *Percent* |
| Linoxyn | 40 to 48 | 70 to 80 |
| Coagulable fluid oxidized constituents | 28 to 36 | 5 to 10 |
| Unoxidized constituents and non-hardening constituents | 20 to 25 | 15 to 25 |

*Example 3*

|  | Fresh composition | Seasoned composition |
|---|---|---|
|  | *Percent* | *Percent* |
| Linoxyn | 44 to 52 | 75 to 90 |
| Coagulable fluid oxidized constituents | 26 to 33 | 0 to 10 |
| Unoxidized constituents and non-hardening constituents | 20 to 25 | 10 to 20 |

More generally in fresh linoleum compositions according to preferred practice of this invention, the oil material in the complete composition contains about 40% to about 55% of linoxyn and about 45% to about 60% of non-hardened constituents. In the examples given in the foregoing tables the linoxyn varies from about 40% to about 52% and the non-hardened constituents include about 26% to about 36% of coagulable fluid oxidized constituents and about 20% to about 25% of unoxidized constituents and non-hardening constituents. In the seasoned compositions there is an admixture of a drying or semi-drying oil material and chlorinated rubber, the oil material containing about 70% to about 90% of linoxyn and about 10% to about 30% of non-hardened constituents. The relative proportion of the linoxyn and non-hardened constituents will vary somewhat, depending upon the period of seasoning, the oil material used in the compositions, etc. The chlorinated rubber constitutes about 1% to 25% (preferably 5% to 20%) by weight of the admixture of oil and chlorinated rubber in the complete composition and a major proportion of the chlorinated rubber is in solution with the non-hardened constituents of the oil material. Preferably all of the chlorinated rubber is in solution with the non-hardened constituents of the oil. Whether the composition is freshly prepared or seasoned it is desirable to have in combination with the chlorinated rubber an oil containing about 10% to about 30% of fluid non-hardened constituents.

The foregoing examples indicate the preferred proportions of the constituents of oil material used in the oil-chlorinated rubber materials. The preparation of the oil component so as to have the relative constituents above mentioned is not essential, however. For example, the oil can be prepared so as to minimize oxidation thereof as by causing the oil to jell in the absence of air or in an inert (oxygen free) atmosphere. Moreover the chlorinated rubber may be mixed with the oil under similar conditions. Thus a mixture of coagulated oil and chlorinated rubber can be produced which is only very slightly oxidized. The product has somewhat greater tacky and adhesive characteristics than when the oil is coagulated and likewise oxidized, although coagulated oil-chlorinated rubber material prepared with at least some oxidation of the oil component is preferable in the practice of this invention.

It is regarded as preferable in the preparation of oil-chlorinated rubber material to coagulate the oil first and incorporate the chlorinated rubber with the oil after the oil has been coagulated to a jelly-like consistency. However, it is also possible to mix the oil with the chlorinated rubber, and to thereafter cause the oil to coagulate with or without accompanying oxidation. When following this alternate procedure, however, it is necessary not to exceed the decomposition temperature of chlorinated rubber and this temperature limitation, in certain processes for accomplishing coagulation of oil, would unduly prolong the operation.

The mixing of the oil with the chlorinated rubber is preferably initiated when the oil contains less than about 30% of coagulated (linoxyn) constituents. While the oil during the blending of the constituents may undergo further coagulation, the mixing of the chlorinated rubber with oil containing at least initially a large proportion of fluid constituents affords a more homogeneous and more desirable product. The blending operation is discontinued when the coagulation and/or oxidation attains the degrees mentioned above by way of affording preferred examples of the practice of this invention. Mixing chlorinated rubber with linoleum cement which has previously been subjected to the degree of oxidation that is usual in fresh linoleum composition is not recommended inasmuch as blending of the coagulated oil comprised in the cement with the chlorinated rubber is not satisfactory and inasmuch as desired mutual solution of the chlorinated rubber with non-hardened constituents of the oil is difficult or impossible.

During the mixing of the chlorinated rubber with the coagulated oil, the different materials tend to become homogenized in that the mass becomes more and more uniform appearing. However, it is likely, as aforesaid, that the linoxyn constituents of the oil do not go into solution with the chlorinated rubber. It is preferable that the homogenization be continued until all of the chlorinated rubber goes into solution with non-hardened constituents of the coagulated oil.

In the foregoing specific examples it is to be noted that the actual blending of chlorinated rubber with oil takes place between admixtures of oil and chlorinated rubber when the chlorinated rubber constitutes about 25% or less by weight of the admixture. This has been found to be important as the solution of all or at least a high proportion of the chlorinated rubber with a fluid oil constituent is promoted. The presence of chlorinated rubber which is in solution with a fluid oil constituent is much to be preferred to chlorinated rubber which is merely reduced to small particle size, the particles being distributed in substantially undissolved state in the mixture.

With further reference to the foregoing examples, the oil-clorinated rubber material may be used as the entire binder part of the composition, or may be brought into admixture with other material comprising coagulated oil. In the latter case it is of the essence of this invention that the proportion of chlorinated rubber in the admixture of chlorinated rubber and oil material as a whole, shall be about 1% to about 25% by weight of such admixture, preferred results being attained when the chlorinated rubber constitutes about 5% to about 20% of the chlorinated rubber and coagulated oil material as a whole. However, when additional coagulated oil material is admixed with a separately prepared oil-chlorinated rubber material, it is important that the oil material used in separately preparing the oil-chlorinated rubber material contain sufficient non-hardened constituents to dissolve therein at least a major proportion of the chlorinated rubber. From another point of view it is preferable that the amount of chlorinated rubber in the final admixture of oil and chlorinated rubber be not substantially greater than the amount of non-hardened constituents of the oil material in the composition as a whole.

As mentioned above, it is possible and desirable in the practice of this invention to reduce or eliminate the resin component of linoleum cement. However, many of the advantages of this invention are availed of when resinous material is incorporated in the linoleum composition. Rosin is the most commonly used resinous material. Other resinous materials may also be used, such as East Indian gum, kauri gum, ester gum, the various synthetic resins of the cumarone, phenol-aldehyde and other types, all of which have the typical lustre, conchoidal fracture, and thermoplastic nature of resinous materials.

In the binder part of linoleum compositions embodying this invention it is preferable to keep the total amount of resinous material and chlorinated rubber below about 25% and even better results are attained when the amount is less than 20%. If the total amount of chlorinated rubber and resinous material is increased above 25% by weight, of the mixture of coagulated oil, resin, and chlorinated rubber, the binder loses its flexibility, resiliency and workability. It is therefore undesirable merely to add chlorinated rubber to ordinary linoleum cement containing 20% to 35% of resin. If a substantial quantity of chlorinated rubber is employed then the resin content of the composition should be greatly reduced where the advantages of this invention are to be availed of in high degree. If as much as 20 to 25% of chlorinated rubber is employed then the resinous material preferably should be eliminated substantially entirely.

In the practice of this invention, linseed oil and perilla are regarded as preferable. In the specific examples above given linseed oil was used. Other drying or semi-drying oils may, however, be used in the practice of this invention. Moreover, an oil, as that term is used herein, refers broadly to any drying or semi-drying oil in whole or in part and to mixtures of whole and/or portions of such oils.

In the foregoing examples of this invention the use of oil-chlorinated rubber material has been described as a binder material for linoleum composition or as used with a binder material comprising coagulated oil. It is not beyond the scope of this invention, however, to employ the oil-chlorinated rubber material in the manner aforesaid with other binder materials. For example, an oil-chlorinated rubber material wherein the oil component contains not less than about 75% of coagulated constituents (e. g., according to Example 3), can be used not only with a binder material of linoleum cement but also with other binders such as soluble cellulosic derivatives (cellulose esters and ethers), resinous materials such as the synthetic alkyl resins or resins of the phenol aldehyde type, pitch, etc. More generally the oil-chlorinated rubber materials described herein and composed within the limits set forth may be blended with binders containing other binder components in addition to or in substitution for linoleum cement.

While this invention has been described in connection with certain specific examples thereof, it is to be understood that this has been done merely for the purpose of illustration and that the scope of this invention is to be limited only according to the language of the following claims.

We claim:

1. A composition suitable for linoleum or the like which comprises a filler in major proportion and an admixture of a drying or semi-drying oil material and chlorinated rubber; said oil material containing coagulated and oxidized constituents and fluid non-hardened constituents; said chlorinated rubber being at least in major proportion in mutual solution with fluid non-hardened constituents of said oil material and constituting about 1% to about 25% by weight of said admixture; and the particles of said filler being interspersed in said admixture.

2. A composition suitable for linoleum or the like which comprises a filler material in major proportion and an admixture of a drying or semi-drying oil material, chlorinated rubber, and a resin; said oil material containing coagulated and oxidized constituents and fluid non-hardened constituents; said chlorinated rubber being at least in major proportion in mutual solution with the fluid non-hardened constituents of said oil material and constituting about 1% to about 20% by weight of said admixture; said resinous material constituting less than about 10% by weight of said admixture; and the total amount of chlorinated rubber and resinous material being less than about 25% by weight of said admixture.

3. A composition suitable for linoleum or the like which comprises filler material in major proportion including cellulosic filler material and an admixture of a drying or semi-drying oil material and chlorinated rubber; said oil material containing coagulated and oxidized constituents and fluid non-hardened constituents; said chlorinated rubber being in at least major proportion in mutual solution with the fluid non-hardened constituents of the oil material and being present in an amount not substantially greater by weight than the amount of the said non-hardened constituents of said oil material; said composition containing less than 10% by weight of porous cellulosic filler material; and said filler material being interspersed in said admixture.

4. A mouldable composition suitable for linoleum or the like which comprises filler material in major proportion and an admixture of drying or semi-drying oil material and chlorinated rubber; said oil material containing about 40% to about 55% of linoxyn and about 45% to about 60% of fluid non-hardened constituents; said chlorinated rubber being at least in major proportion in mutual solution with the fluid non-hardened constituents of said oil material and constituting about 1% to about 25% of said admixture; and said filler material being interspersed in said admixture.

5. A moldable composition suitable for linoleum or the like which comprises filler material in major proportion and an admixture of drying or semi-drying oil material and chlorinated rubber; said oil material containing about 40% to about 52% of linoxyn, about 26% to about 36% of coagulable fluid oxidized constituents, and about 20% to about 25% of unoxidized and non-hardening constituents; said chlorinated rubber being at least in major proportion in mutual solution with the fluid non-hardened constituents of the said oil material and constituting about 5% to about 20% of said admixture; and said filler material being interspersed in said admixture.

6. A composition suitable for linoleum or the like which comprises a binder and interspersed in said binder discrete particles of coagulated oil-chlorinated rubber material; the coagulated oil in said coagulated oil-chlorinated rubber material containing not less than about 74% of linoxyn, not more than 8% of coagulable fluid oxidized constituents and not more than 18% of unoxidized constituents and non-hardening constituents; and said chlorinated rubber constituting not substantially more than about 25% of said coagulated oil-chlorinated rubber material.

7. Seasoned composition suitable for linoleum or the like which comprises a filler material in major proportion and an admixture of a drying or semi-drying oil material and chlorinated rubber; said oil material containing about 70% to about 90% of coagulated constituents and about 10% to about 30% of non-hardened constituents; and said chlorinated rubber constituting about 1% to 25% of said admixture and at least a major proportion thereof being in mutual solution with said non-hardened constituents of said oil material.

8. Seasoned composition suitable for linoleum or the like which comprises a filler material in major proportion including cellulosic filler material and an admixture of a drying or semi-drying oil material and chlorinated rubber; said oil material containing about 70% to about 80% of coagulated constituents and about 20% to about 30% of non-hardened constituents; and said chlorinated rubber constituting about 5% to about 20% of said admixture and being substantially completely in mutual solution with said non-hardened constituents of said oil material.

9. In the preparation of a composition suitable for linoleum or the like, the steps comprising mixing chlorinated rubber with a drying or semi-drying oil material containing less than about 30% of coagulated constituents and subjecting the mixture to heat and agitation to homogenize said materials until at least a major proportion of the chlorinated rubber is dissolved in fluid constituents of the oil and effect an increase in the coagulated constituents of the oil material to greater than about 38%.

10. In the preparation of a composition suitable for linoleum or the like, the steps which comprise mixing chlorinated rubber with a drying or semi-drying oil material containing less than 30% of coagulated constituents; the chlorinated rubber being less than about 25% of the mixture, and subjecting the mixture to heat and agitation to homogenize the mixture and to increase the amount of coagulated constituents of the oil material to greater than about 38%.

11. In the preparation of a composition suitable for linoleum or the like, the steps comprising mixing chlorinated rubber with a drying or semi-drying oil material containing less than 30% of coagulated constituents and subjecting the mixture to heat and agitation in the presence of oxygen containing gas to homogenize the mixture and to increase the amount of coagulated constituents of the oil material to at least about 74%.

12. In the preparation of a composition suitable for linoleum or the like, the steps comprising mixing chlorinated rubber with a drying or semi-drying oil material, the chlorinated rubber being less than about 25% of the mixture, and subjecting the mixture to heat and agitation in the presence of oxygen containing gas to homogenize the mixture until at least a major proportion of chlorinated rubber is dissolved in fluid constituents of the oil material, and to increase the proportion of oxidized and coagulated constituents thereof.

13. In the preparation of a composition suitable for linoleum or the like, the steps which comprise mixing chlorinated rubber with drying or semi-drying oil material, the chlorinated rubber being less than about 25% of the mixture, and subjecting the mixture to agitation while maintained at about 200 to 240° F. in the presence of oxygen containing gas, and discontinuing the heat and agitation when the oil component of the mixture contains about 38% to about 76% of linoxyn, about 37% to about 7% of coagulable fluid oxidized constituents, and about 25% to about 17% of unoxidized constituents and non-hardening constituents.

14. In the preparation of a composition suitable for linoleum or the like, the steps comprising mixing chlorinated rubber with a drying or semi-drying oil material, subjecting the mixture to heat and agitation in the presence of oxygen containing gas, the heat and agitation being discontinued when the oil material in the mixture contains about 40% to about 54% of linoxyn, about 36% to about 22% of coagulable fluid oxidized constituents, and about 20% to about 25% of unoxidized constituents and non-hardening constituents, mixing the mixture thus prepared with filler material, and seasoning the composition.

15. In the preparation of a composition suitable for linoleum or the like, the steps comprising mixing chlorinated rubber with a drying or semi-drying oil and subjecting the mixture to heat and agitation, the chlorinated rubber being less than about 25% of the mixture and the heat and agitation being discontinued when at least a major proportion of the chlorinated rubber is dissolved in the fluid constituents of the oil and when the oil material contains about 40% to about 48% coagulated constituents, about 36% to about 28% of coagulable fluid oxidized constituents, and about 20% to about 25% of unoxidized fluid constituents and non-hardening fluid constituents.

16. In the preparation of a moldable composition suitable for linoleum or the like, the steps comprising mixing chlorinated rubber with a drying or semi-drying oil material, subjecting the mixture to heat and agitation in the presence of an oxygen containing gas to homogenize said materials and to cause coagulation and oxidation of the oil until the oil component in the mixture contains about 48% to about 54% of linoxyn, about 28% to about 22% of coagulable fluid oxidized oil, and about 20% to about 25% of unoxidized and non-hardening constituents, and admixing the mixture so prepared with a linoleum cement comprising oxidized and coagulated oil which contains about 40% to about 48% of linoxyn, about 36% to about 28% of coagulable fluid oxidized constituents, and about 20% to about 25% of unoxidized constituents and non-hardening constituents.

17. In the preparation of a composition suitable for linoleum or the like, the steps comprising mixing chlorinated rubber with a drying or semi-drying oil material, subjecting the mixture to heat and agitation in the presence of oxygen containing gas until the oil component in the mixture contains at least about 74% of linoxyn, reducing the mixture to finely-divided particles, and distributing the particles in discrete form in a binder.

18. In the preparation of a composition suitable for linoleum or the like, the steps comprising mixing chlorinated rubber with a drying or semi-drying oil material, subjecting the mixture to agitation while maintained at about 200° F. to about 240° F. in the presence of oxygen containing gas, the chlorinated rubber being less than about 25% of the mixture, discontinuing the heat and agitation when the oil component of the mixture contains at least about 74% of linoxyn, and distributing the mixture in the form of finely-divided particles in a binder containing oxidized and coagulated oil, the oil in said binder containing substantially less proportion of coagulated constituents than the oil component of said oil-chlorinated rubber mixture.

19. In the preparation of a composition suitable for linoleum or the like, the steps which comprise mixing chlorinated rubber with a drying or semi-drying oil material containing less than 30% of coagulated constituents, subjecting the mixture to heat and agitation to homogenize said materials and to increase the amount of coagulated constituents of the oil material to greater than 38%, combining additional coagulated oil material with said homogenized oil-chlorinated rubber material, and limiting the proportion of chlorinated rubber to an amount equal to about 1% to about 25% of the chlorinated rubber and coagulated oil material as a whole.

DONALD H. SPITZLI.
REEVES L. KENNEDY.